US006736440B1

(12) United States Patent
Hashim et al.

(10) Patent No.: US 6,736,440 B1
(45) Date of Patent: May 18, 2004

(54) DECKLID HINGE FOR VEHICLE

(75) Inventors: Waqar Hashim, Grand Blanc, MI (US); Akin O. Ajilore, Macomb, MI (US); Carl E. Chamberlain, Ann Arbor, MI (US); Glenn J. Esch, St. Johns, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/320,977

(22) Filed: Dec. 17, 2002

(51) Int. Cl.[7] .............................................. B62D 25/10
(52) U.S. Cl. .................. 296/76; 296/146.8; 296/146.11
(58) Field of Search ................................ 296/76, 146.1, 296/1.1, 46.8, 146.11, 146.2, 56, 146.4; 49/502, 387; 16/289

(56) References Cited

U.S. PATENT DOCUMENTS

| | | | | | |
|---|---|---|---|---|---|
| 2,668,320 | A | * | 2/1954 | Lustig | 296/76 |
| 4,294,039 | A | * | 10/1981 | Dalheimer et al. | 296/76 |
| 4,733,434 | A | * | 3/1988 | Wegge | 296/76 |
| 4,776,626 | A | * | 10/1988 | Seyler | 296/76 |
| 4,966,403 | A | * | 10/1990 | Nordstrom | 296/76 |
| 6,070,929 | A | * | 6/2000 | Barkley | 296/76 |
| 6,269,521 | B1 | * | 8/2001 | Gabel | 296/76 |
| 6,283,530 | B1 | * | 9/2001 | Hollerbach | 296/76 |
| 6,419,293 | B1 | * | 7/2002 | Nicholas et al. | 296/76 |

OTHER PUBLICATIONS

USSN 10/153,054 filed May 21, 2002, Attorney Docket GP-301682.

* cited by examiner

*Primary Examiner*—D. Glenn Dayoan
*Assistant Examiner*—Greg Blankenship
(74) *Attorney, Agent, or Firm*—Laura C. Hargitt

(57) ABSTRACT

A decklid hinge is provided for a rear compartment of a vehicle. The decklid hinge includes a body side strap adapted to be connected to a vehicle body of the vehicle. The decklid hinge also includes a decklid side strap adapted to be connected to a decklid for closing a recess of the rear compartment. The decklid hinge includes a first link interconnecting the body side strap and the decklid strap for allowing rotation therebetween. The decklid hinge further includes a second link interconnecting the body side strap and the decklid strap for guiding pivoting action of the hinge along a predefined path. The decklid hinge includes a primary spring interconnecting the body side strap and the decklid strap to counterbalance a weight of the decklid when opening. The decklid hinge further includes a free-rise mechanism to allow the decklid to free-rise from a partial open position to a full open position.

11 Claims, 3 Drawing Sheets

DECKLID HINGE FOR VEHICLE

TECHNICAL FIELD

The present invention relates generally to hinges for vehicles and, more particularly, to a decklid hinge for a vehicle.

BACKGROUND OF THE INVENTION

It is known to provide a decklid for a vehicle to open and close a rear compartment or trunk of a vehicle body of the vehicle. Typically, the deck lid is attached to the vehicle body with at least one, preferably a pair of laterally spaced hinges. Currently, the decklid hinges of the free-rise type use a large size goose-neck hinge for counter-balancing a weight of the decklid. However, these goose-neck hinges reduce trunk volume of the rear compartment by 1 to 1.5 cu. ft. This is undesired because trunk volume is a key attribute that purchasers compare when making a vehicle selection.

One attempt to maintain trunk volume and counterbalance the weight of the decklid is to use either pneumatic or hydraulic devices. However, the cost of such devices is prohibitive and results in adding complexity to a vehicle assembly process.

Because the overall length of vehicles is being reduced in some cases, the trunk volume is relatively small. The type of hinge that can be used in such a situation is a four-bar hinge, but this type of hinge does not allow free-rise capability.

Therefore, it is desirable to provide a decklid hinge for a decklid of a vehicle that provides a four-bar hinge with free-rise capability for the decklid. It is also desirable to provide a decklid hinge for a decklid of a vehicle that includes a counterbalance mechanism to counter a weight of the decklid. Therefore, there is a need in the art to provide a decklid hinge for a vehicle that meets these desires.

SUMMARY OF THE INVENTION

It is, therefore, one object of the present invention to provide a new decklid hinge for a vehicle.

It is another object of the present invention to provide a decklid hinge for a vehicle that includes a free-rise feature on a four-bar hinge.

It is yet another object of the present invention to provide a decklid hinge for a decklid of a vehicle that includes a counterbalance mechanism to counter a weight of the decklid.

To achieve the foregoing objects, the present invention is a decklid hinge for a decklid on a rear compartment of a vehicle including a body side strap adapted to be connected to a vehicle body of the vehicle. The decklid hinge also includes a decklid side strap adapted to be connected to a decklid for closing a recess of the rear compartment. The decklid hinge includes a first link interconnecting the body side strap and the decklid strap for allowing rotation therebetween. The decklid hinge further includes a second link interconnecting the body side strap and the decklid strap for guiding pivoting action of the hinge along a predefined path. The decklid hinge includes a primary spring interconnecting the body side strap and the decklid strap to counterbalance a weight of the decklid when opening. The decklid hinge further includes a free-rise mechanism to allow the decklid to free-rise from a partial open position to a full open position.

One advantage of the present invention is that a new decklid hinge is provided for a decklid of a vehicle. Another advantage of the present invention is that the decklid hinge incorporates a free-rise feature and counterbalance on a four bar hinge to allow maximum utilization of trunk volume without adding significant cost or complexity to the vehicle. Yet another advantage of the present invention is that the decklid hinge is a mechanical type that is easy to maintain and offers better reliability than a pneumatic or hydraulic system. Still another advantage of the present invention is that the decklid hinge incorporates a free-rise feature on a four bar hinge to combine the compact package size of a four bar hinge with the convenience of a free-rise decklid. A further advantage of the present invention is that the decklid hinge incorporates a free-rise feature on a four bar hinge that allows added user convenience because it will allow the user to open the decklid at forty-five degrees (45°) to shield cargo from rain when it is raining and also allow the user to open the decklid to the full open position hands-free to enable easy cargo loading and unloading.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
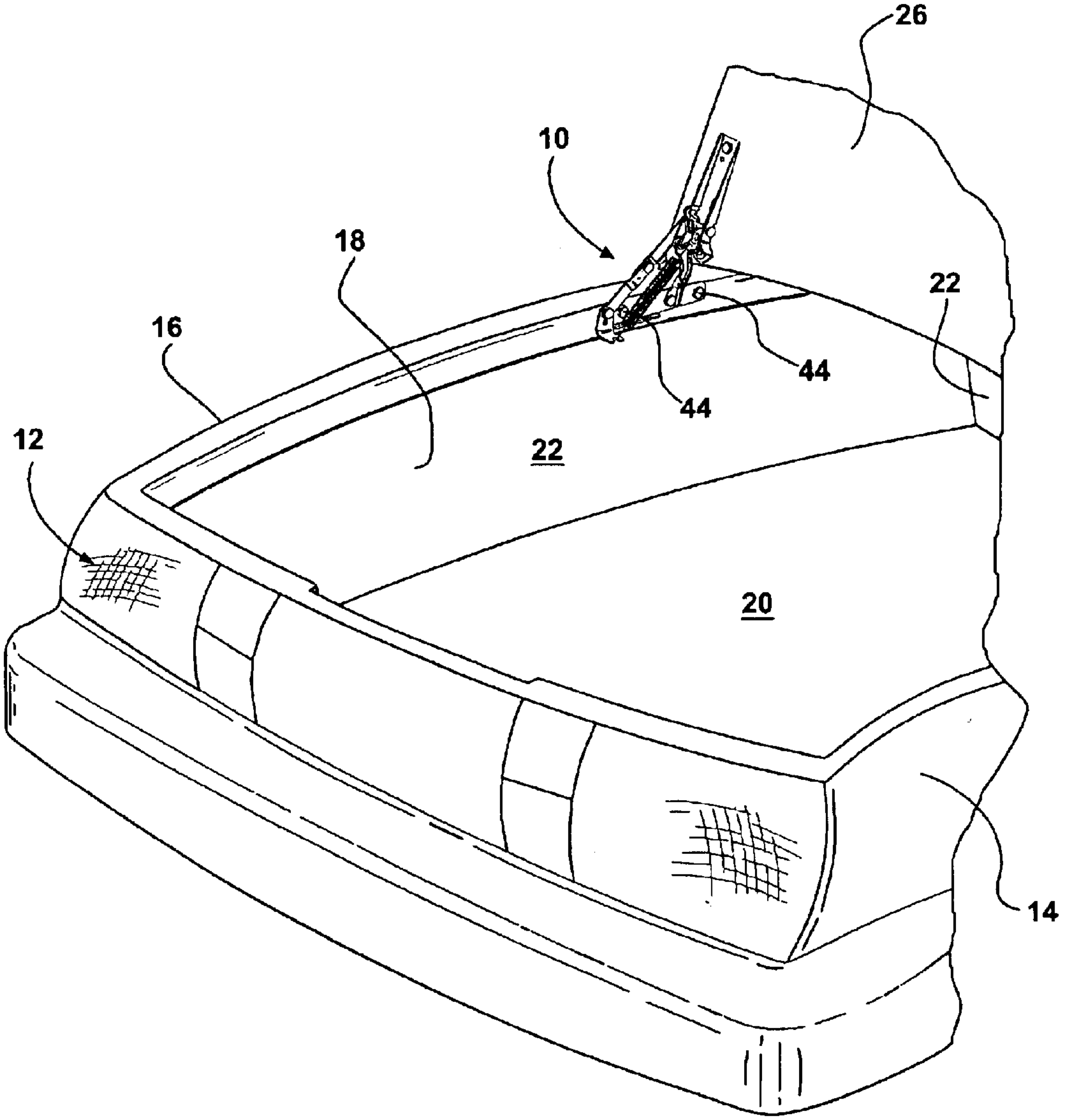
FIG. 1 is a perspective view of a decklid hinge, according to the present invention, illustrated in operational relationship with a vehicle.

Referring to the drawings and in particular FIG. 1, one embodiment of a decklid hinge 10, according to the present invention, is shown for a vehicle such as a motor vehicle, generally indicated at 12. Such motor vehicles 12 typically include a vehicle body 14 (partially shown) forming a trunk or rear compartment 16. The rear compartment 16 has a recess 18 therein. The recess 18 is formed by a floorpan 20 and side walls 22 extending upwardly from the floorpan 20 and generally perpendicular thereto. The vehicle body 14 also includes a decklid 26 closing the recess 20. The decklid 26 is attached to the rear compartment 16 of the vehicle body 14 by at least one, preferably a pair of laterally spaced decklid hinges 10. It should be appreciated that only one decklid hinge 10 is illustrated in FIG. 1 and will be subsequently described. It should also be appreciated that, except for the decklid hinge 10, the vehicle 12 is conventional and known in the art.

Figure 2:
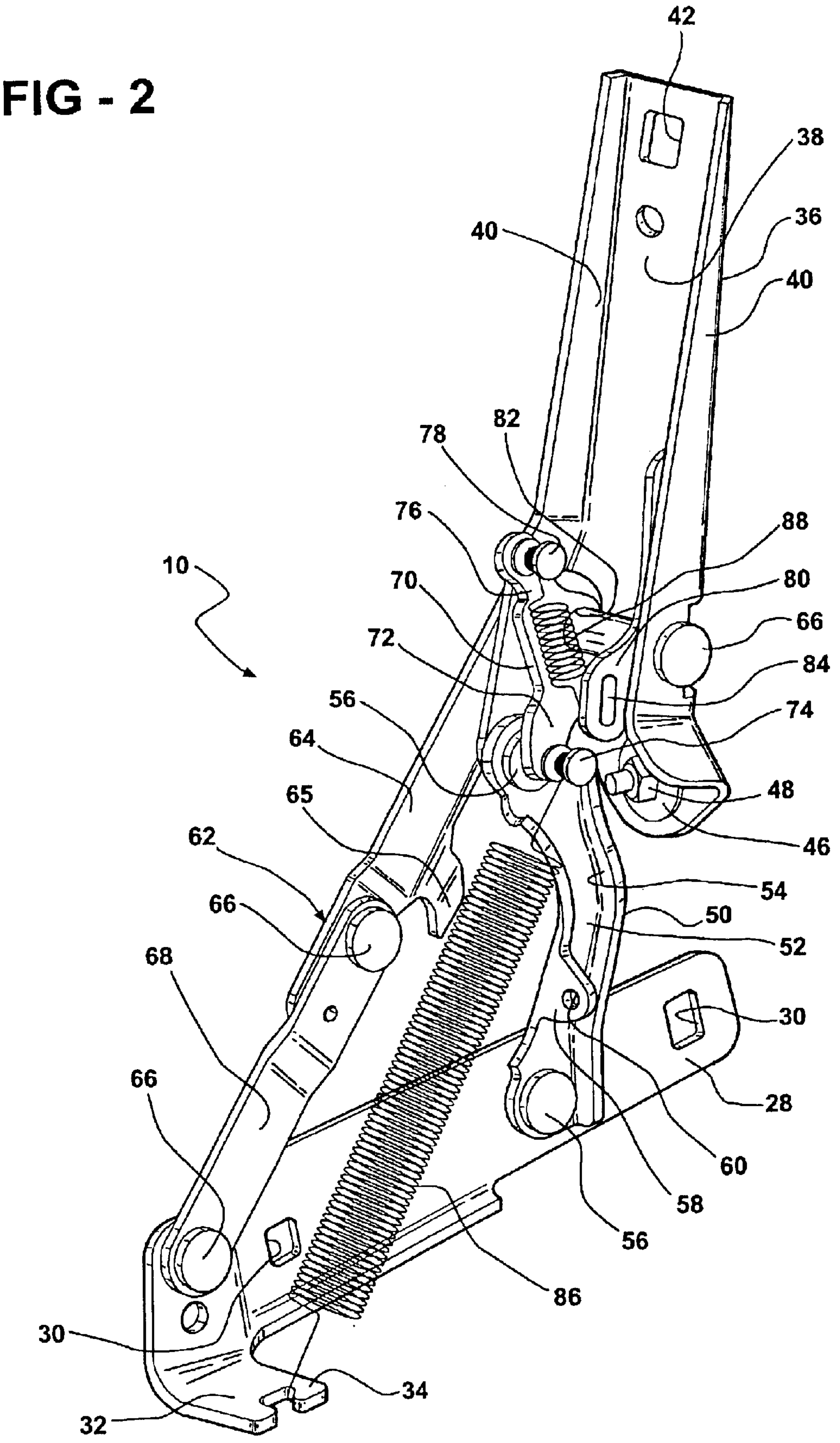
FIG. 2 is a perspective view of the decklid hinge of FIG. 1 illustrated in an open operating position.

Referring to FIG. 2, the decklid hinge 10 includes a body side strap 28 to allow the decklid hinge 10 to be mounted to the vehicle body 14. The body side strap 28 is generally rectangular in shape. The body side strap 28 extends longitudinally and has at least one, preferably a plurality of apertures 30 extending therethrough. The decklid hinge 10 also includes at least one, preferably a plurality of fasteners (not shown) such as bolts to attach the body side strap 28 to the vehicle body 14. Each of the fasteners extends through some of the apertures 30 and corresponding apertures (not shown) in the vehicle body 14 and are engaged by nuts (not shown) to prevent the fasteners from disengaging the apertures 30. It should be appreciated that the fasteners are conventional and known in the art.

The body side strap 28 also includes a flange 32 extending generally perpendicularly and laterally outwardly at one end thereof. The flange 32 is generally rectangular in shape. The flange 32 may include a spring retention hook 34 extending laterally and longitudinally therefrom for a function to be described. The body side strap 28 is made of a rigid material such as metal.

The decklid hinge 10 includes a decklid side strap 36 to allow the decklid 26 to be attached to the decklid hinge 10. The decklid side strap 36 has a generally inverted "U" shaped cross-section. The decklid side strap 36 extends longitudinally and has a base wall 38 and a pair of side walls 40 spaced laterally and extending generally perpendicular to the base wall 38. The base wall 38 includes at least one, preferably a plurality of apertures 42 extending therethrough. The decklid hinge 10 also includes at least one, preferably a plurality of fasteners 44 such as bolts to attach the decklid side strap 36 to the decklid 26. Each of the fasteners 44 may include a washer 46 and extend through some of the apertures 42 and corresponding apertures (not shown) in the decklid 26 and are engaged by nuts 48 to prevent the fasteners 44 from disengaging the apertures 42. The decklid side strap 36 is made of a rigid material such as metal. It should be appreciated that the fasteners 44 are conventional and known in the art.

The decklid hinge 10 includes a first or short link 50 to allow pivoting action of the decklid hinge 10. The first link 50 extends longitudinally and has a base wall 52 and a side wall 54 extending generally perpendicular to the base wall 52. The base wall 52 includes at least one, preferably a plurality of apertures (not shown) extending therethrough. The decklid hinge 10 also includes at least one, preferably a plurality of fasteners 56 such as bolts to attach the first link 50 to the decklid side strap 36 at a forward end thereof and to the body side strap 28 at a forward end thereof. The first link 50 also includes a flange 58 extending generally perpendicularly and laterally outwardly at one end thereof. The flange 58 may have an aperture 60 extending therethrough to receive a fastener (not shown) such as a bolt. The short link 50 is made of a rigid material such as metal.

The decklid hinge 10 includes a second or upper link, generally indicated at 62, to guide the pivoting action of the hinge 10 along a predetermined path. The upper link 62 includes an upper long link 64 extending longitudinally. The upper long link 64 includes at least one, preferably a plurality of apertures (not shown) extending therethrough. The upper long link 64 may include a flange 65 extending outwardly to act as a stop when the decklid hinge 10 is in a service position. The upper long link 64 is made of a rigid material such as metal.

The decklid hinge 10 also includes at least one, preferably a plurality of fasteners 66 such as bolts. One of the fasteners 66 is used to attach the upper long link 64 to the decklid side strap 36 at a forward end thereof. It should be appreciated that the fasteners 66 are conventional and known in the art.

The upper link 62 also includes a lower long link 68 extending longitudinally. The fasteners 66 attach the lower long link 68 to a rearward end of the upper long link 64 and a rearward end of the body side strap 28. The upper link 62 is made of a rigid material such as metal.

The decklid hinge 10 includes a pop and hang link 70 to enable the decklid 26 to pop and hang at an approximately forty-five degrees (45°) open position. The pop and hang link 70 has an aperture (not shown) extending therethrough to receive the fastener 66 to attach the pop and hang link 70 to the decklid side strap 36. The pop and hang link 70 also has a first flange 72 extending outwardly and overlapping the short link 50. The first flange 72 has an aperture (not shown) extending therethrough to receive a fastener 74 for a function to be described. The pop and hang link 70 also has a second flange 76 extending outwardly and opposite the first flange 72. The second flange 76 has an aperture (not shown) extending therethrough to receive a fastener 78 for a function to be described. The pop and hang link 70 is made of a rigid material such as metal.

The decklid hinge 10 also includes a free rise link 80 to enable the decklid 26 to free-rise to a full open condition. The free rise link 80 extends longitudinally and has an aperture 82 extending therethrough to receive the fastener 66 to attach the free rise link 80 to the decklid side strap 36. The free rise link 80 also has an aperture 84 extending therethrough for a function to be described. The free rise link 80 is made of a rigid material such as metal.

The decklid hinge 10 includes a main spring 86 to power the decklid 26 to a pop and hang position by applying a force to the pop and hang link 70. The main spring 86 is of a coil type and has a first end connected to the fastener 74 on the pop and hang link 70. The main spring 86 also has a second end connected to the spring retention hook 40. It should be appreciated that the main spring 86 applies a force to counterbalance the weight of the decklid 26.

The decklid hinge 10 includes a secondary spring 88 to power the decklid 26 from the pop and hang position to a free-rise position by applying a force to the free rise link 80. The secondary spring 88 is of a coil type and has a first end extending through the aperture 84 and connected to the free rise link 80. The main spring 86 also has a second end connected to the fastener 78 on the pop and hang link 70. It should be appreciated that the secondary spring 88 applies a force to the free rise link 80 to power the decklid 26 from the pop and hang position to a free-rise position.

Figure 3:
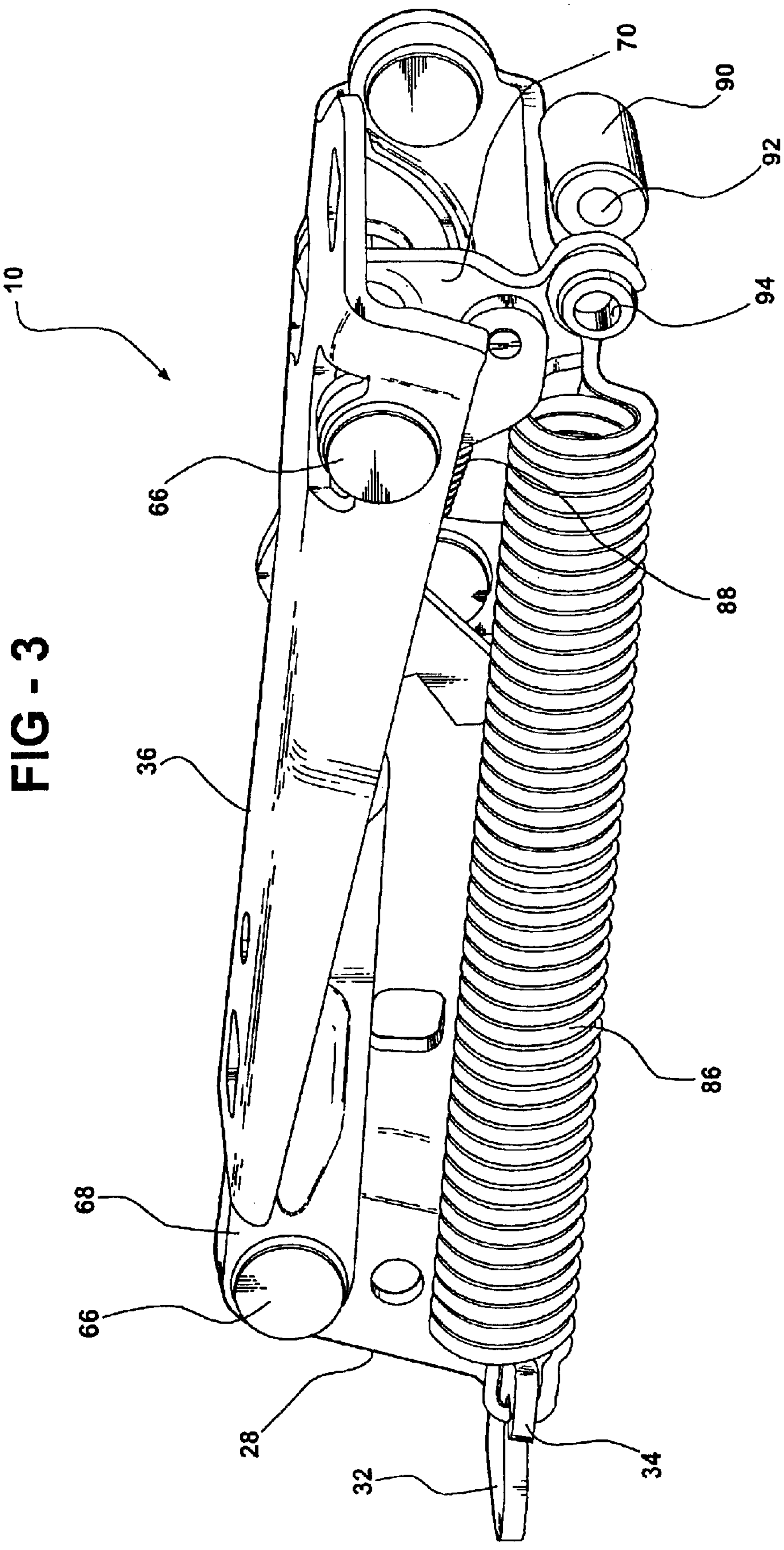
FIG. 3 is a perspective view of another embodiment, according to the present invention, of the decklid hinge of FIG. 1 illustrated in a closed operating position.

Referring to FIGS. 2 and 3, the decklid hinge 10 is shown in open and closed operating positions, respectively. With the decklid hinge 10, if the user wants to open the decklid 26 when it is raining, the user can activate a remote key (not shown) to allow the decklid 26 to open and "pop" to a forty-five degree (45°) open angle, shielding the contents in the recess 18 of the rear compartment 16. If the decklid 26 needs to be opened to a full open position for loading and unloading large objects, the user can apply a force to the free rise link 80 via the decklid 26 to power the decklid 26 from the pop and hang position to a free-rise position to open the decklid 26 to its full open position. It should be appreciated that the decklid 26 can be shut manually like any other decklid 26. It should also be appreciated that the decklid hinge 10 allows the decklid 26 to be rotated open and closed.

Referring to FIG. 3, another embodiment, according to the present invention, of the decklid hinge 10 is shown. Like parts have like reference numerals. In this embodiment, the decklid hinge 10 includes a free-rise solenoid 90 to mechanically disconnect the pop and hang link 70 and free rise link 80 when a remote key (not shown) is activated for a second time, allowing free-rise action to occur. The free-rise solenoid 90 is of an electric type and has a first end connected to the body side bracket 28 and an extendable and retractable member 92 to engage and disengage an aperture or solenoid catch 94 on the pop and hang link 70. The free-rise solenoid 90 is connected to a source of power such as an electronic controller (not shown).

With the decklid hinge 10, if the user wants to open the decklid 26 when it is raining, the user can activate the remote key once and the decklid 26 will "pop" to a forty-five degree (45°) open angle, shielding the contents in the recess 18 of the rear compartment 16. If the decklid 26 needs to be opened to a full open position for loading and unloading large objects, the user can activate the remote key again. When this occurs, the controller outputs a signal to the free-rise solenoid 90 to retract the member 92 to disengage the solenoid catch 94, allowing the decklid 26 to open to its full open position. The decklid 26 can be shut manually like any other decklid 26 and the free-rise solenoid 90 will reset itself automatically to extend the member 92 to engage the solenoid catch 94. It should be appreciated that the free-rise solenoid 90 mechanically connects the pop and hang link 70 and free rise link 80 in the closed or reset position.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A decklid hinge for a decklid on a rear compartment of a vehicle comprising:

a body side strap adapted to be connected to a vehicle body of the vehicle;

a decklid side strap adapted to be connected to a decklid for closing a recess of the rear compartment;

a first rigid link interconnecting said body side strap and said decklid strap for allowing rotation therebetween wherein said first link is pivotally connected at a forward end of said body side strap and at a forward end of said decklid strap;

a second rigid link interconnecting said body side strap and said decklid strap for guiding pivoting action of the hinge along a predefined path wherein said second link is pivotally connected to a rearward end of the body side strap and a forward end of said decklid strap;

a primary coil spring interconnecting said body side strap and said decklid strap to counterbalance a weight of the decklid when opening; and a free-rise mechanism to allow the decklid to free-rise from a partial open position to a full open position.

2. A decklid hinge as set forth in claim 1 wherein said second link comprises a third rigid link pivotally connected to said decklid side strap.

3. A decklid hinge as set forth in claim 2 wherein said second link further comprises a fourth rigid link pivotally connected to said third link and pivotally connected to said body side strap.

4. A decklid hinge as set forth in claim 3 including a fastener for fastening said third link and said fourth link together to rotate as a unit.

5. A decklid hinge as set forth in claim 1 wherein said free-rise mechanism includes a pop and hang link pivotally connected to said decklid side strap.

6. A decklid hinge as set forth in claim 5 wherein said primary spring has one end connected to said pop and hang link and another end connected to said body side strap.

7. A decklid hinge as set forth in claim 5 wherein said free-rise mechanism includes a free rise link connected to said decklid side strap.

8. A decklid hinge as set forth in claim 7 wherein said free-rise mechanism includes a secondary spring interconnecting said pop and hang link and said free rise link.

9. A decklid hinge as set forth in claim 1 including a free-rise solenoid connected to said body side strap to mechanically connect said pop and hang link and said free rise link when energized and mechanically disconnect said pop and hang link and said free rise link when de-energized.

10. A decklid hinge as set forth in claim 1 including fasteners for fastening said first link and said second link to said body side strap and said decklid side strap.

11. A rear compartment of a vehicle comprising:

a vehicle body having a recess formed therein;

a decklid for opening and closing said recess; and at least one decklid hinge interconnecting said vehicle body and said decklid, said at least one decklid hinge comprising a body side strap connected to said vehicle body, a decklid side strap connected to said decklid, a first rigid link interconnecting said body side strap and said decklid strap for allowing rotation therebetween wherein said first link is pivotally connected at a forward end of said body side strap and at a forward end of said decklid strap, a second rigid link interconnecting said body side strap and said decklid strap for guiding pivoting action of said hinge along a predefined path wherein said second link is pivotally connected to a rearward end of the body side strap and a forward end of said decklid strap, a primary coil spring interconnecting said body side strap and said decklid strap to counterbalance a weight of the decklid when opening, and a free rise link connected to said decklid side strap to allow the decklid to free-rise from a partial open position to a full open position.

* * * * *